United States Patent [19]
Eberhardt et al.

[11] Patent Number: 4,734,163
[45] Date of Patent: Mar. 29, 1988

[54] METHOD OF AND APPARATUS FOR PRODUCING GYPSUM FIBER BOARDS (PLASTERBOARD)

[75] Inventors: Kurt Eberhardt, Bad Hersfeld; Heinrich Blackert, Bebra; Gerald Forbert; Josef Steinkuhl, both of Bad Hersfeld; Horst Hose, Kassel; Friedrich Bahner, Rotenburg A.D.F., all of Fed. Rep. of Germany

[73] Assignee: Babcock BSH Aktiengesellschaft, Krefeld, Fed. Rep. of Germany

[21] Appl. No.: 737,398

[22] Filed: May 23, 1985

[30] Foreign Application Priority Data

May 25, 1984 [DE] Fed. Rep. of Germany ....... 3419558

[51] Int. Cl.⁴ .............................................. D21H 3/78
[52] U.S. Cl. .................. 162/181.3; 162/225; 264/82
[58] Field of Search ..................... 162/145, 181.3, 225; 264/82; 106/115, 109

[56] References Cited

U.S. PATENT DOCUMENTS

3,489,583  1/1970  Bloom et al. .......................... 106/109
4,213,931  7/1980  Trutnev et al. ....................... 106/109

FOREIGN PATENT DOCUMENTS

2816466  10/1979  Fed. Rep. of Germany ........ 264/82
124524  10/1978  Japan ................................... 106/109

Primary Examiner—Peter Chin
Attorney, Agent, or Firm—Karl F. Ross; Herbert Dubno

[57] ABSTRACT

A method of and apparatus for producing gypsum fiber boards includes introducing shaped boards provided of a mash of calcium sulphate dihydrate and fibrous material and possibly additives after dewatering and shaping the mash into at least one pressure vessel and to heat the boards at saturated steam atmosphere to 120°–160° C. over a predetermined period. Thereafter, the boards are allowed to cool down within the pressure vessel to a temperature of about 100° or less before being discharged therefrom.

9 Claims, 4 Drawing Figures

METHOD OF AND APPARATUS FOR PRODUCING GYPSUM FIBER BOARDS (PLASTERBOARD)

FIELD OF THE INVENTION

Our present invention refers to a method of and apparatus for producing gypsum fiber boards.

BACKGROUND OF THE INVENTION

The German patent publication DE-AS No. 29 18 974 describes a method of producing gypsum fiber boards in which pulp fibers are comminuted to a certain degree and mixed with calcium sulphate hemihydrate and possible further additives to a wet mass from which subsequently the boards are shaped.

Hardening of the boards is obtained by setting the hemihydrate to calcium sulphate dihydrate. This method has the drawback that the shaping of the boards must be carried out only during the short setting period of the hemihydrate. Moreover, this method renders it rather difficult to rouse excess material obtained for example during cutting of the boards.

The German publication DE-OS No. 26 49 300 describes a method for producing plate-shaped material in which calcium sulphate hemihydrate is mixed in the presence of water with 5–60 weight-% fibrous material. Subsequently, the pulp is dewatered and the formed cake is shaped to the desired size. Thereafter, the still moist plate-shaped material is dried at temperatures between 95° and 140° C. For improving the properties of the final product, a binding agent is added to the mixture of water, calcium sulphate dihydrate and fibrous material. Recrystallization of the gypsum is not provided. Gypsum fiber boards produced in this manner have considerably less strength in comparison to those obtained through recrystallization of hemihydrate to dihydrate.

The production of formed bricks is disclosed in the German publication DE-OS No. 31 17 662 in which moist calcium sulphate dihydrate—possibly mixed with sand or other aggregates—is pressed and then hydrothermally treated at a temperature of up to 200° C. to provide a dehydration. The hydrothermal treatment is e.g. performed in an autoclave. Thereafter, i.e. after being removed from the autoclave, the shaped bodies are allowed to cool down.

An apparatus for producing gypsum fiber boards is known from the German publication DE-OS No. 32 28 159. Here, fibrous material and gypsum are supplied to a mixer to provide a suspension which is placed onto an endless screening belt for dewatering the suspension and then is transferred onto a further conveyor belt by means of a transfer device. After passing a cutting device, the formed boards are introduced into a dryer. This prior art apparatus is rather complicated and provides gypsum fiber boards of insufficient strength.

OBJECT OF THE INVENTION

It is thus the principal object of our present invention to provide an improved method and improved apparatus for producing gypsum fiber boards obviating the afore-stated drawbacks.

SUMMARY OF THE INVENTION

We realize this object according to the invention by providing at least one pressure vessel in which shaped boards are heated in saturated steam to a temperature of 120° to 160° C. over a predetermined period and then allowed to cool down to a temperature of about 100° C. or less. The shaped boards are obtained by providing a mash of calcium sulphate dihydrate and fibrous material and possibly some additives. The mash is dewatered and formed to a cake. Thereafter the cake is further dewatered and shaped to boards which are introduced into the pressure vessel.

Through the provision of such pressure vessels, gypsum fiber boards of superior quality can be produced in a most economical and fast manner. In addition, it is now possible for the first time to produce mechanically sound, strong and stable boards of more than 20 mm thickness in one layer and in series.

We have found that by adjusting the pH-value of the boards prior to their entry into the pressure vessel to equal or be less than 7, the setting time is considerably shortened without negatively influencing the fibrous material. Advantageously, the pH-value should be adjusted to be between 4 and 5.

According to a further feature of the invention, at least two pressure vessels are provided which are alternatingly charged with shaped boards and cooperate with each other in such a manner that one of the vessels is heated with the steam released from the other pressure vessel. Through this feature, the production speed of gypsum fiber boards is considerably increased while its energistic input is simultaneously reduced. Instead of pressure vessels connected parallel to each other, one pressure vessel can be used which is divided into three successive compartments. Upon treatment of shaped boards, the first two compartments are equipped with a heating unit while the third compartment is connected to the first compartment so that steam can be released to allow cooling of the boards within the third compartment while simultaneously using the steam to heat the first compartment. The transport of the boards through such a pressure vessel is provided either with a carriage or with a conveyor belt.

We control the cooling phase advantageously by lowering the pressure within the pressure vessel or within the third compartment of the pressure vessel during the release of steam by at most 1 bar per minute. This will prevent a cracking of the boards especially in the event boards are to be treated of more than 10 mm thickness.

According to a further feature of the invention, the pressure vessels accommodate a frame carrying a plurality of plates whereby each board is clamped between two such plates. This measure guarantees a reduction of the cooling phase and thus an increase of the expansion speed of the steam while simultaneously preventing damage of the boards.

BRIEF DESCRIPTION OF THE DRAWING

The above and other objects, features and advantages of my present invention will now be described in greater detail with reference to the accompanying drawing in which.

SPECIFIC DESCRIPTION

Figure 1:
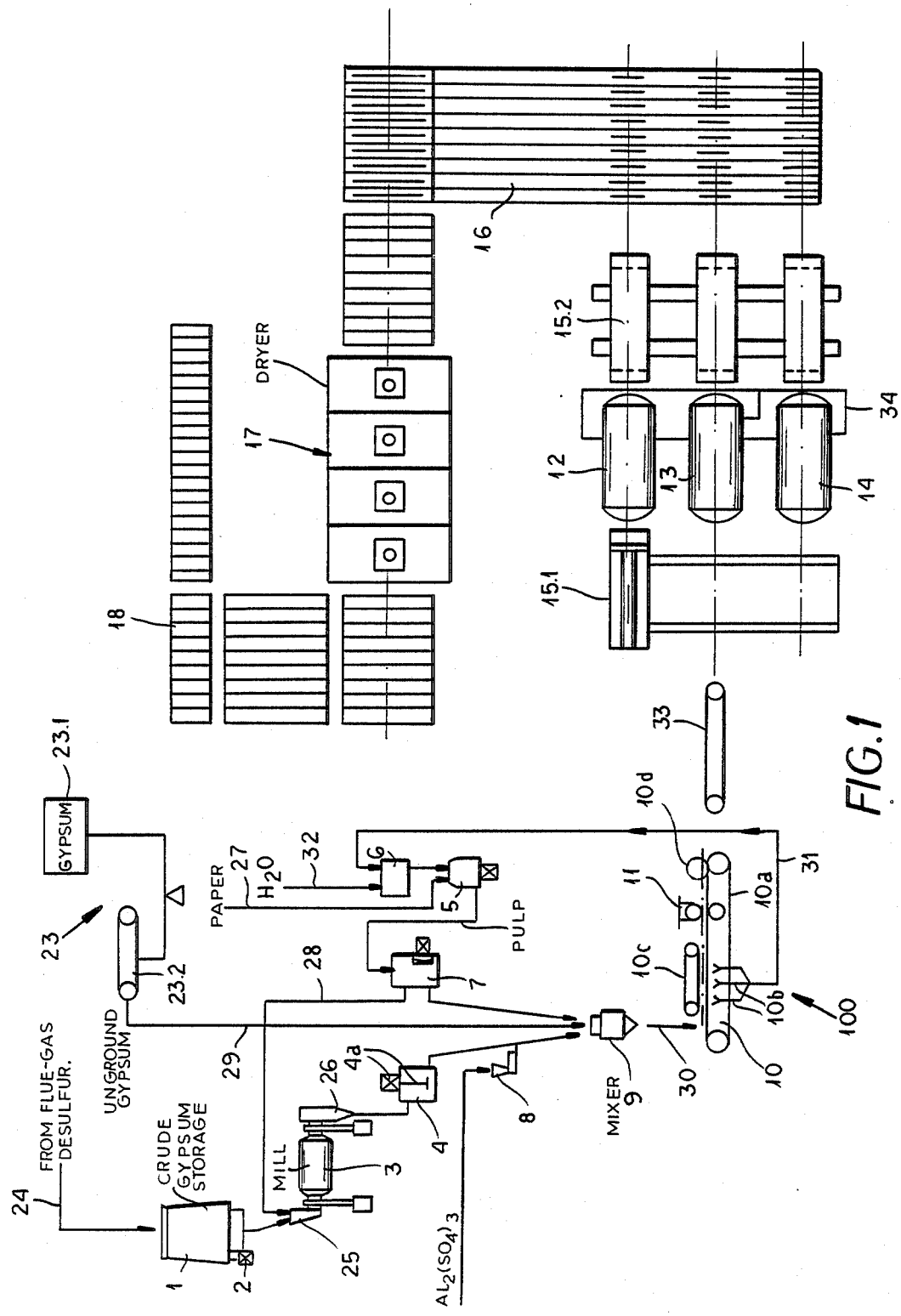
FIG. 1 is a schematic view of a first embodiment of an apparatus according to the invention for producing fiber boards of gypsum.
Figure 3:
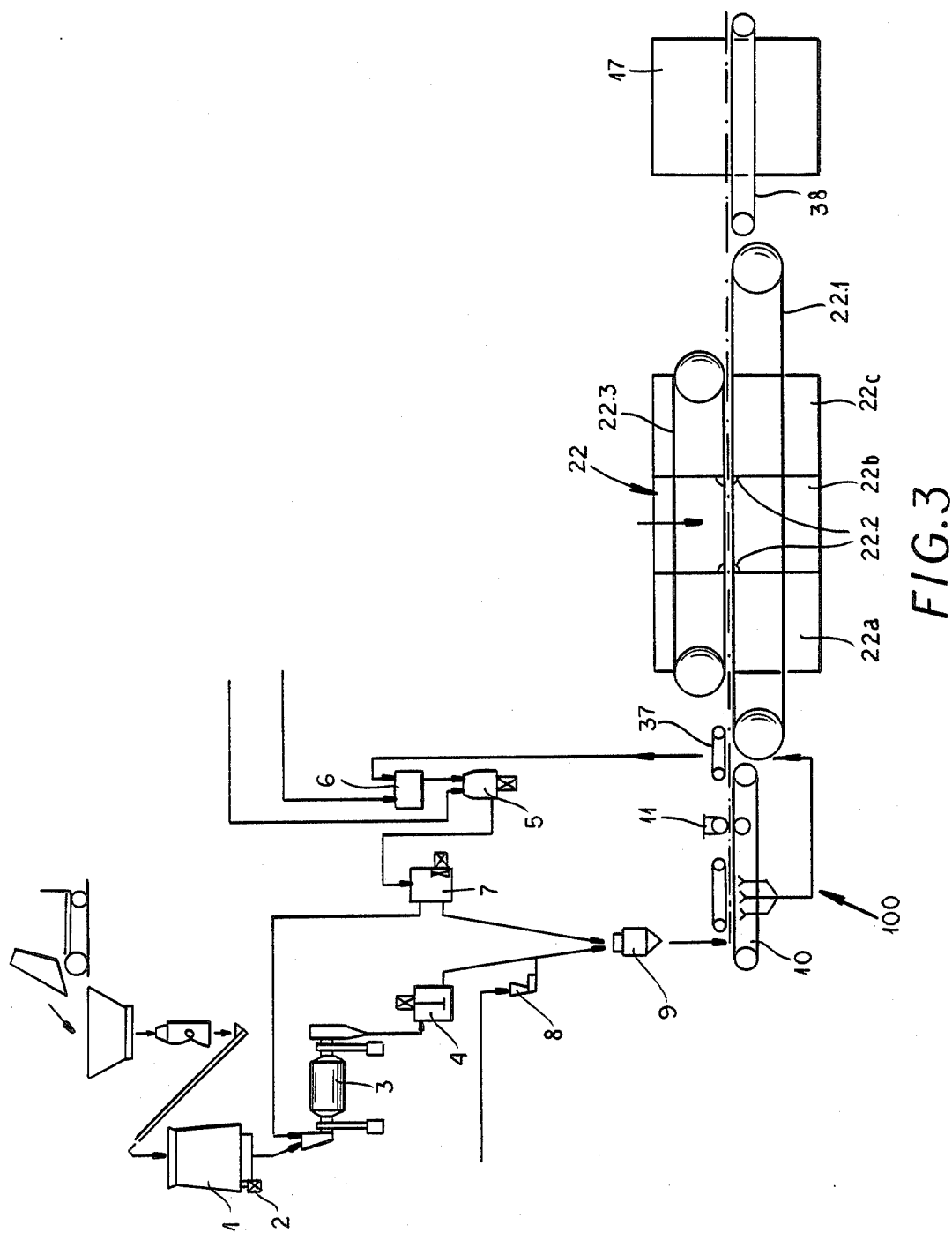
FIG. 3 is a schematic view of a third embodiment of an apparatus according to the invention for producing fiber boards of gypsum.

FIG. 1 shows a silo or bin 1 containing raw gypsum which is e.g. produced in a flue gas desulfurizer operated by wet scrubbing using a lime solution and supplied via line 24 through appropriate transport means—as indicated in FIG. 3. The silo 1 is provided at its lower section with an outlet 2 through which the gypsum is discharged and introduced through inlet 25 into a mill 3—in the present embodiment a tube mill. By simultaneously adding water, gypsum is ground within the mill 3 to a grain size between 1000 and 3500 Blaine and finally discharged through outlet 26 into a reservoir 4 in which the so-formed suspension is stirred (by a stirrer accommodated within the reservoir 4) and temporarily stored.

Connected to the reservoir 4 is a mixer 9 which can thus be continuously supplied with suspension from the reservoir 4. The mixer 9 is further connected to a dosing device 8 which supplies in predetermined quantities an additive—e.g. aluminum sulphate. The addition of potassium sulphate or ferric sulphate as well as the addition of a mineral acid like sulphuric acid is also feasible.

For providing the gypsum portion with the required fiber fraction, the apparatus according to the invention includes a paper preparing device which includes a container 5 accommodating a stirrer and communicating with a water supply source 6. As fiber material, waste paper is used which is introduced into the container 5 via line 27 and mixed with water derived from the supply 6 to provide a pulp. Instead of waste paper, also fiber glass, fibers of wood residues, grass etc. is usable. The container 5 further communicates with a reservoir 7 in which the pulp is introduced and allowed to thicken by deposition. Excessive water removed from the thickened pulp is recycled via line 28 back to the tube mill 3 for being mixed with gypsum supplied from the silo 1.

In addition, the mixer 9 is connected to a gypsum station which is generally designated by reference numeral 23 and includes a silo 23.1 containing gypsum and a metering device 23.2. A supply line 29 connects the metering device 23.2 with the mixer 9 into which unground gypsum is thus introduced.

Via an outlet line 30, the mixture or mash is discharged from the mixer 9 and supplied to a station 100 for dewatering and shaping the mash. When providing the mash with a fiber material/gypsum ratio of 5-20 weight-%, preferably 7-10 weight-% fiber material, gypsum fiber boards of considerable strength and good fire-proof properties can be produced. The station 100 comprises a suction band filter 10 including an endless conveyor belt 10a and a suction device (only indicated by arrows 10b) which extends below the upper run of the belt 10a and by which the mash is dewatered to a certain degree and formed to a cake. Cooperating with the suction device is a conveyor belt 10c which extends above the upper run of belt 10a and supports the dewatering of the passing mash. The water removed from the mash is collected and returned via line 31 to the water supply 6 which is additionally fed with fresh water through line 32. Arranged at a downstream section of the conveyor belt 10a is a roll stand provided with press rolls 11 which oppose each other at a distance sufficient to allow the boards to pass therethrough and to be further dewatered. It is certainly feasible to provide a multi-step pressure dewatering e.g. including one or several screening band presses without previous suction dewatering. At a suitable location, the station 100 is further provided with a clipper 10d for cutting the so-formed boards into desired shape.

If required, the station 100 can be provided with suitable shaping devices for producing non-planar boards as e.g. corrugated slabs.

Downstream of the station 100 is an endless conveyor belt 33 which cooperates with a charging unit 15.1. The charging unit 15.1 is movable in horizontal direction so as to allow alignment with each one of three pressure vessels 12, 13, 14.

Figure 1A:
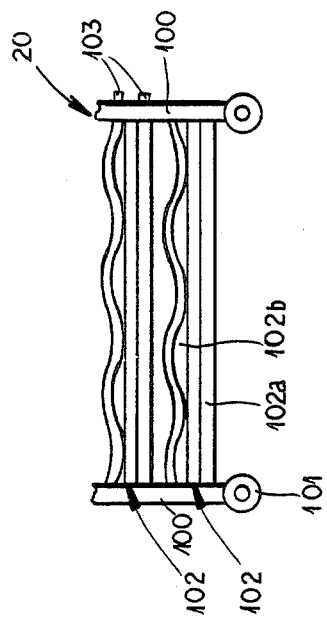
FIG. 1A is a side elevational view of a mobile frame carrying the mats which are solidified into boards.

Consequently, the charging unit 15.1 takes up from the conveyor belt 33 the sized boards and then supplies the latter to the respective one of the pressure vessels 12, 13, 14 as will be described hereinafter. As seen in FIG. 1A, the stacking frame 20 can have frame members 100 with wheels 101 holding apart the horizontal inelastic and vertically movable intermediate plates 102 which can be locked in place by pins 103. Each intermediate plate 102 is a double plate 102a, 102b held together by a steam penetrable framework.

Each pressure vessel 12, 13, 14 is provided with a stacking frame (not shown) including horizontal intermediate plates which are rigid and so dimensioned as to cover completely the gypsum fiber boards arranged inbetween two superposing plates. These horizontal plates which consist of double-steel plates are vertically movable and are fixed to each other at a short distance by a vapor-permeable frame. Through appropriate fasteners, the plates can be fixed in the respective vertical position. When producing non-planar boards, respectively profiled sheets are used as intermediate plates (see FIG. 1A).

In addition, each pressure vessel 12, 13, 14 is provided with a supply and draining line for steam as well as circulation ventilators. As generally indicated by reference numeral 34, the vessels 12, 13, 14 are connected to each other via steam lines.

Aligned with each pressure vessel 12, 13, 14 is a discharge unit 15.2 which receives the boards treated in the respective vessels 12, 13, 14 and transfers them to a conveyor 16. The conveyor 16 leads to a unit 17 for drying the boards. Via further conveyors 18 the dried boards are transferred from the dryer 17 to a not-shown storage location.

After having described the individual parts of the apparatus, the mode of operation will now be explained in more detail.

From the silo 1, raw gypsum is introduced into the mill 3 and ground under addition of water until 30% of the raw gypsum has a grain size of approximately 3000 Blaine. The so-obtained suspension having about 50 weight-% water is then stored in the reservoir 4 from which the mixer 9 can continously be supplied. From the station 23, gypsum which is not comminuted and has a Blaine number of about 1700 is directly introduced into the mixer 9 to provide the still remaining required amount of gypsum. To the mixer 9, pulp from the reservoir 7 as well as an additive—in the present example aluminum sulphate—from the dosing device 8 are added. The addition of aluminum sulphate is preferred as it serves not only as a flocculant for improving dewatering of the gypsum-fiber mixture but serves also as setting accelerator for the hemihydrate subsequently obtained.

The dosage of the device 8 is controlled in such a manner that the gypsum-fiber mixture has a pH-value equal to or less than 7, preferably between pH=4 and pH=5, upon introduction into the pressure vessels 12, 13, 14. Depending on the raw material and required setting period, the addition of additive amounts between 0.1 and 2 weight-% are contemplated.

The water content of the pulp and the gypsum suspension is controlled such that a mash is obtained within the mixer 9 with a water/solid ratio of about 3.4. The ratio between gypsum and fibrous material is about 10:1, corresponding to a fiber content somewhat less than 10% by weight.

The mash is then supplied to the dewatering and shaping station 100 to provide boards in two stages. During the first stage, the mash is dewatered to a water/solid ratio of about 0.7 by means of suction and simultaneously formed to a cake. Subsequently, the cake is further dewatered through pressure by means of the press rolls 11 until the water/solid ratio is less than 0.4, preferably about 0.35. This ratio provides a particularly high reaction speed of dihydrate to alpha-hemihydrate. We should note that such a degree of dewatering is only feasible upon addition of flocculants—like aluminum sulphate.

After being dewatered and shaped, the cake is cut into boards or slabs which are then supplied to the charging unit 15.1. The thickness of the shaped boards is between 10 and 40 mm. By means of the charging unit 15.1, the boards are alternatingly supplied and stacked within the pressure vessels 12, 13, 14 in such a manner that inbetween two superimposed intermediate plates one board is clamped.

As already mentioned, the pressure vessels 12, 13, 14 operate alternatingly. Assuming in a first phase pressure vessel 12 is empty and ready for receiving the boards, the charging unit 15.1 after taking up the boards from conveyor 33 is moved sidewardly so as to be aligned with the entrance to the pressure vessel 12 and to allow charging of boards into the latter. While pressure vessel 12 is charged, e.g. the pressure vessel 13 is heated up by allowing steam to flow from vessel 14 to vessel 13. The pressure vessel 14 is thus cooled down by expansion.

Consequently, in the first phase, the respective connecting line 34 between the pressure vessels 13 and 14 is opened so that steam flows from vessel 14 (which is to be cooled down) into the vessel 13 to preheat the latter until the pressure is balanced between the vessel 13 and 14. Thereafter, saturated steam is introduced into vessel 13 to elevate the temperature to about 140° C. During the second phase, the pressure vessel 12 which is accordingly charged with boards is preheated by opening the connection between vessels 12 and 13 so that vessel 13 expands. In the meantime, vessel 14 is emptied and recharged with boards by moving the charging unit 15.1 as to be aligned with the entrance of vessel 14. In the third phase which closes the cycle, pressure vessel 12 is allowed to expand by opening the connection with vessel 14 which in turn is preheated while vessel 13 is emptied and recharged by moving the charging unit 15.1 as to be aligned with the entrance to vessel 13.

The preheating of the individual vessels 12, 13, 14 is thus provided with recycled steam from one of the respective vessel which is to be cooled. Further heating to a temperature of about 140° C. is obtained by introducing saturated steam into the respective vessel at a pressure of about 6 bar whereby the pressure within the vessel increases to slightly more than 3.5 bar. Since the steam circulates and penetrates between the double plates, a uniform heating as well as cooling of the boards is secured. The cooling step is provided—as already mentioned—by allowing the steam to be released from the respective one of the vessels 12, 13, 14. For preventing damage of the boards during the cooling phase, the pressure is decreased by less than 1 bar per minute.

During heating in saturated steam atmosphere to a temperature of 140° C., calcium sulphate dihydrate is converted to alpha-hemihydrate. Depending on the thickness of the treated boards, the heating phase lasts between 3 and 50 minutes.

During subsequent expansion to a pressure of 1 bar, the temperature is lowered to about 100° so as to allow the hemihydrate to be rehydrated into dihydrate and the boards to be strengthened. The rehydration is primarily obtained with split crystal water which remained within the boards. Therefore, a saturated steam atmosphere is necessary during the entire treating period within the pressure vessels in order to avoid a drying out of the boards from inside prior to the rehydration. By providing a slow pressure decrease of less than 1 bar per minute and by clamping the boards between the double plates, a cracking of the boards in view of the pressure drop is prevented. This is especially true when thick boards of e.g. 40 mm thickness are treated which are especially susceptible to cracking during a pressure drop.

Note, however, that through cooling the surface of the boards during the expansion phase while simultaneously maintaining an increased steam pressure within the vessels 12, 13, 14, the rehydration period can be accelerated without causing damages by a too extensive pressure difference. The cooling can be provided e.g. by means of formed parts with additional coolant supply.

After treatment within the pressure vessels 12, 13, 14, the boards are discharged via unit 15.2 to the conveyor 16 which transports them to the dryer 17. The boards leave the dryer 17 with a residual moisture of about 4–5% and are then transported by conveyors 18 to the storage location.

In case raw material is used which is easy to dewater, the energy consumption can be minimized if the boards are pre-dewatered to about 10–15 weight-% prior to their entry into the pressure vessels 12, 13, 14. In this connection, I may note that the dewaterability is influenced by the grain distribution of the gypsum as well as by the used fiber material. When using such materials, water losses during expansion (about 5%) and vaporization through inherent heat after leaving the pressure vessels 12, 13, 14 result in a basically dry board so that no additional drying is required. However, saving the drying step requires a more complicated gypsum preparation and dewatering process and, moreover, the reaction speed is also reduced.

Figure 2:
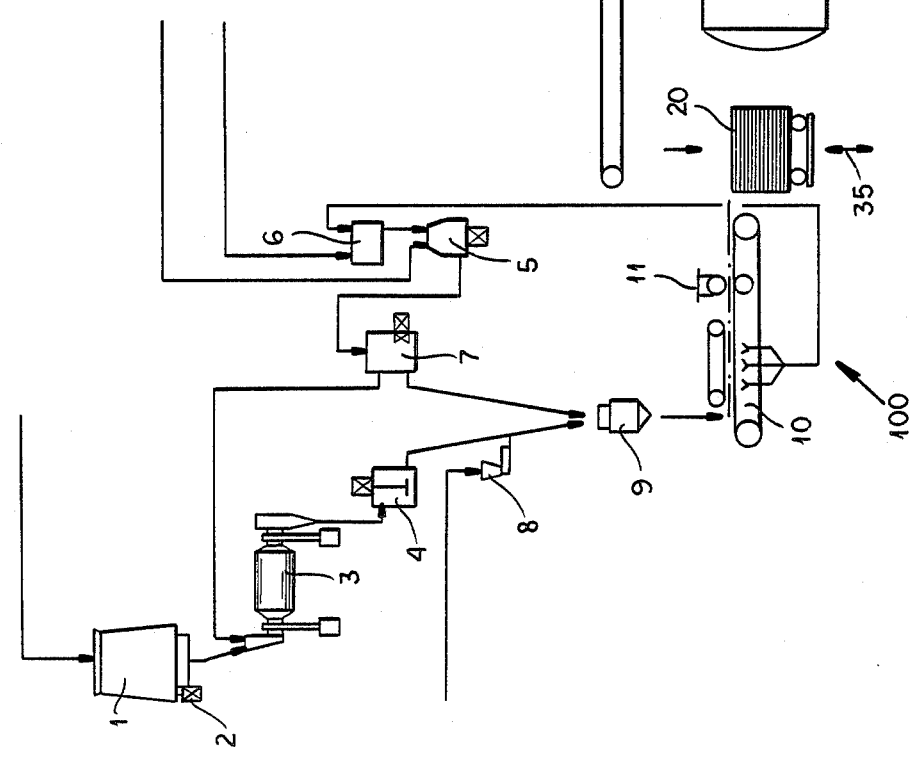
FIG. 2 is a schematic view of a second embodiment of an apparatus according to the invention for producing fiber boards of gypsum.

Turning now to FIG. 2, there is shown a second embodiment of an apparatus for producing gypsum fiber boards. For reason of simplicity, the same reference numerals have been used in FIG. 2 as in FIG. 1 for same parts. Accordingly, the gypsum portion is comminuted in the mill 3 and then continuously fed into the mixer 9 in which it is blended with the fibrous portion supplied from the pulp reservoir 7. Although not illustrated in FIG. 2, additional uncomminuted gypsum is added to the mixer 9 from the gypsum station 23 (see FIG. 1).

After passing through the shaping and dewatering station 100, the shaped boards are stacked on a carriage 20 in such a manner that the boards are spaced to each other by interposed plates. As indicated by arrow 35, the carriage 20 is vertically adjustable to allow stacking of the boards and positioning of each board between superimposed plates. When being sufficiently loaded with boards, the carriage 20 is moved through a pressure vessel 19 which is divided in three successively arranged compartments 19a, 19b, 19c sealed against each other by appropriate sealing means (not shown).

Each of the compartments 19a, 19b is provided with a heating unit (not shown) while the compartment 19c is provided with a discharge device for steam. Connecting the compartment 19c with the compartment 19a is a line 36 through which steam released from compartment 19c is returned to the compartment 19a.

During operation, the carriage 20 loaded with shaped boards enters the first compartment 19a in which the boards are preheated by the steam discharged from the compartment 19c. The carriage 20 then enters the second compartment 19b in which the boards are heated up to the end temperature, and finally enters the third compartment 19c in which the boards are cooled by allowing the steam to expand and to return into compartment 19a into which a new carriage 20 with boards is placed. Once the carriage 20 has passed through the pressure vessel 19, the intermediate plates are transferred onto a conveyor belt 21 and returned to the carriage 20 at a location prior to its entry into the pressure vessel 19. The treated gypsum fiber boards are then introduced into the dryer 17 and finally stored.

In FIG. 3 a further continuously operating apparatus for producing gypsum fiber boards is illustrated. Again, same reference numerals have been used for those parts corresponding in FIG. 1. Accordingly, the mash produced in the mixer 9 is transferred to the shaping and dewatering station 100 and after passing the press rolls 11, the formed boards are transferred onto an endless conveyor belt 22.1. Transfer of the boards in a proper manner is supported by an additional endless conveyor belt 37 which extends from the shaping and dewatering station 100 to the forward end of the conveyor belt 22.1. The conveyor belt 22.1 traverses a pressure vessel 22 which accommodates a further conveyor belt 22.3 whose lower run extends at such a distance to the upper run of the belt 22.1 that a sufficient pressure is exerted during the cooling phase onto the boards when the latter pass through the pressure vessel 22.

The pressure vessel 22 is divided into three successive compartments 22a, 22b, 22c similar to the pressure vessel 19 of FIG. 2. As indicated by reference numeral 22.2, the conveyor belts 22.1, 22.3 are sealed by sealing lips 22.2 at the entrance to and exit from each compartment 22a, 22b, 22c to prevent any kind of losses. In FIG. 3 only the sealing lips 22.2 at the junction between the compartments 22a and 22b as well as 22b and 22c are shown.

After exiting the pressure vessel 22, the treated boards are transferred to a conveyor belt 38 which transports them to the dryer 17. Thereafter, the finished boards can be stored.

We claim:

1. A method of producing gypsum fiber boards, comprising the steps of:
    (a) combining water, calcium sulfate dihydrate and fiber material to form a mash and adjusting the pH of said mash to a value of at most 7;
    (b) forming the mash into shaped boards with a moisture content of less than 40 weight-percent;
    (c) heating the shaped boards in a pressure vessel in a saturated steam atmosphere to a temperature between 120° and 160° for a period between 3 and 50 minutes; and
    (d) releasing steam from said pressure vessel at a rate such that the pressure therein is reduced by at most 1 bar per minute and cooling the shaped boards within the pressure vessel to a temperature of at most 100° C., said shaped boards being clamped between formed elements during said steam release step.

2. The method defined in claim 1 wherein:
    said mash is prepared in step (a) with a fiber material/gypsum ratio of 5 to 20% by weight;
    the calcium sulfate dihydrate used in step (a) has a Blaine number between 1000 and 3500; and
    step (b) includes dewatering the mash by suction to form a cake and then subjecting the cake to pressure.

3. The method defined in claim 2 wherein the shaped boards are heated in step (c) to a temperature between 135° and 145° C.

4. The method defined in claim 2 wherein the mash is prepared in step (a) with a fiber material/gypsum ratio of 7 to 10% by weight.

5. The method defined in claim 2 wherein at least 40% of the total quantity of calcium sulfate dihydrate used in step (a) has a Blaine number smaller than 2000.

6. The method defined in claim 5 wherein more than 70% of the total quantity of calcium sulfate dihydrate used in step (a) has a Blaine number smaller than 2000.

7. The method defined in claim 2 wherein said cake is subjected in step (b) to said pressure over several steps.

8. The method defined in claim 2, further comprising the step of preheating a board to be subsequently subjected to heating in a pressure vessel with the steam released in step (d).

9. The method defined in claim 8, further comprising the step of alternately charging said pressure vessel and another pressure vessel with shaped boards, the steam released during the cooling step from one of said vessels being fed to the other of said vessels.

* * * * *